(No Model.)
J. BERTOUX.
VELOCIPEDE.
No. 495,293. Patented Apr. 11, 1893.
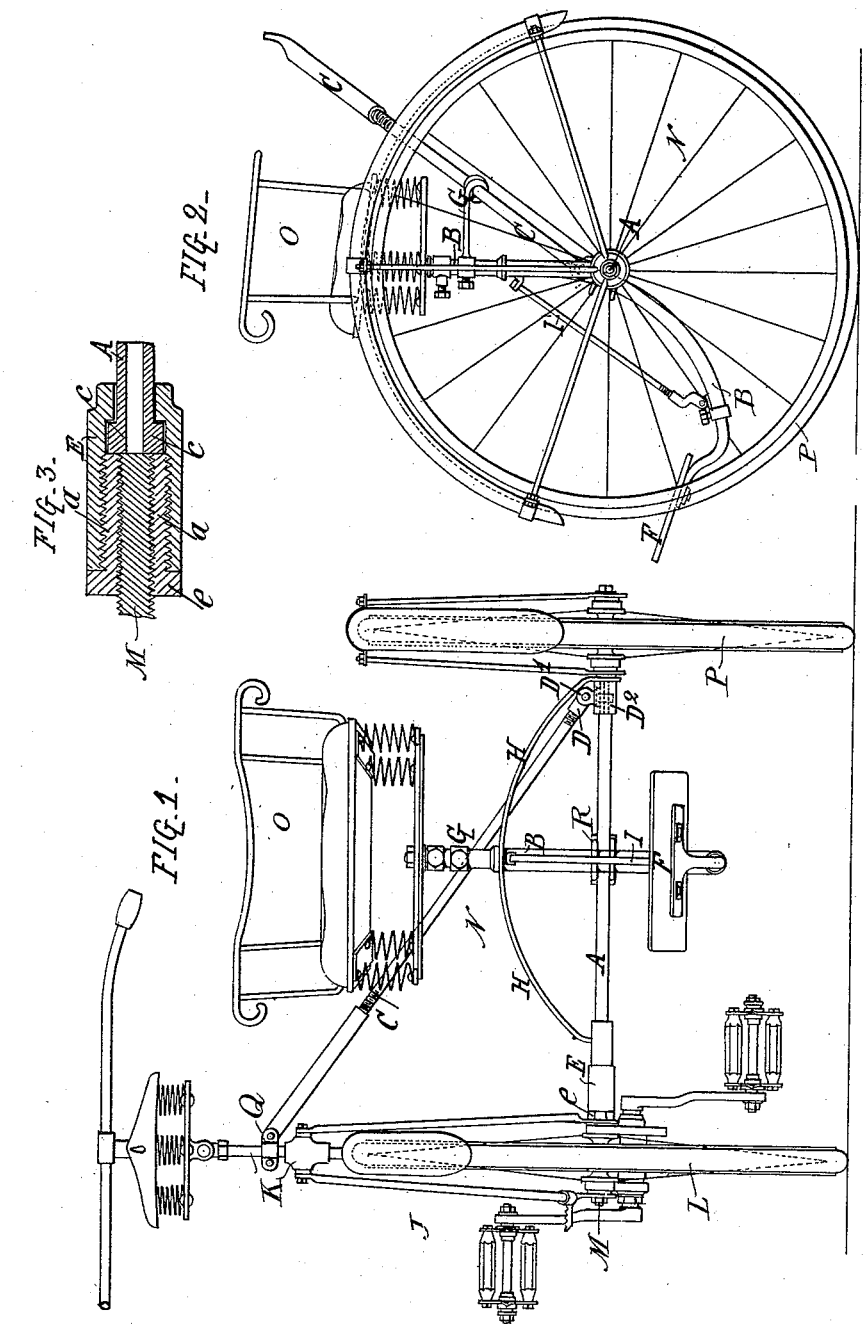
WITNESSES
Fred White
C. K. Fraser
INVENTOR
Jean Bertoux,
By his Attorneys:
Arthur C. Fraser & Co.

UNITED STATES PATENT OFFICE.

JEAN BERTOUX, OF FONTAINEBLEAU, FRANCE.

VELOCIPEDE.

SPECIFICATION forming part of Letters Patent No. 495,293, dated April 11, 1893.

Application filed January 11, 1893. Serial No. 457,999. (No model.) Patented in England November 18, 1892, No. 20,993.

*To all whom it may concern:*

Be it known that I, JEAN BERTOUX, a citizen of the Republic of France, and a resident of Fontainebleau, France, have invented certain new and useful Improvements in Velocipedes, (which invention has been patented in Great Britain, dated November 18, 1892, No. 20,993,) of which the following is a specification.

This invention relates to velocipedes, and aims to provide certain improvements in such apparatus which will be hereinafter fully set forth.

My invention relates to transforming a "bicyclette" or bicycle of any pattern into a tricycle adapted for use by two persons, and it provides improved means for accomplishing this consisting of an apparatus and a wheel, through the adaptation of which to the bicycle this transformation is effected without submitting the bicycle to any alteration which would modify its first destination. The auxiliary apparatus and wheel consist of a frame, carrying the wheel at one side, provided with a seat, and constructed at its other side to be coupled to the rear axle of a bicycle. The latter is only modified to the slight extent of having the nut on the right-hand side of the rear wheel lengthened to form a threaded steel rod about .06 millimeters long, on which can be screwed a union nut or coupling on the end of the axle of the auxiliary apparatus for clamping the latter to the bicycle. Thus the mounting or connecting the parts to form a tricycle, and the dismounting or disconnecting them to restore the bicycle to its normal condition, is rendered so facile as to permit anybody to effect the transformation in a comparatively short time, and to obtain almost simultaneously at wish a bicyclette for one person, or a tricycle for two persons, of which only one rider actuates the machine.

In the accompanying drawings, which illustrate one adaptation of my invention, Figure 1 is a rear elevation of a bicyclette or ordinary safety bicycle transformed into a tricycle according to my improvements. Fig. 2 is a fragmentary side elevation of Fig. 1; and Fig. 3 is a fragmentary detached view, on a scale equaling approximately one-half full size, showing the union nut, and the parts engaged thereby for clamping the auxiliary apparatus to the bicycle in axial section.

Referring to the drawings, let J indicate a bicyclette or ordinary safety bicycle, K the framework thereof, L the rear wheel thereof, M the axial rod of this rear wheel, and $e$ the nut on the right-hand side of the rear wheel L screwed on the end of the axle-rod M as usual.

Let N indicate my improved auxiliary apparatus, O the seat thereof, A the axle therefor, P the auxiliary wheel therefor carried at one end of the axle A, and E the union nut or coupling for clamping the auxiliary frame or apparatus N to the bicycle J.

According to my invention the bicycle J is of ordinary construction in all respects except that the nut $e$ on the right-hand side of the axle bar M of its rear wheel is lengthened and constructed with an outwardly projecting screwthreaded rod $a$ (see Fig. 3) to which the auxiliary frame N is coupled for transforming the apparatus into a tricycle.

According to my invention the auxiliary frame N has an axle A carrying the wheel P at one end, and constructed with a shoulder $c$ at its other end, on which axle is mounted the union nut or coupling fitting over and engaging said shoulder $c$, and internally screw threaded for engagement with the screwthreaded bar $a$ of the nut $e$ of the bicycle J. Thus when the shouldered end of the axle A is placed against the end of the nut $e$, and the union nut or coupling E is screwed on the bar $a$ of the latter, the additional axle A will be clamped solidly against the nut $e$, and thereby firmly connected to the bicycle J at the rear right-hand side thereof. This simple operation of screwing the union nut E upon the bar $a$ of the nut $e$ of the bicycle, is sufficient for coupling the bicycle and the auxiliary frame and wheel together to form a tricycle. In order however to more completely insure the solidity of the connection between the bicycle and auxiliary frame, I provide a tringle or brace C, which at one end is screwed into the nut D, jointed to an eye D' carried by a collar $D^2$ fixed to the axle A near the outer or wheel end thereof, and at its other end is coupled to the frame K of the bicycle J by any suitable coupling, as for example the clamp Q. Thus the tringle C makes a firm brace between the wheel end of the axle A and the frame of the bicycle. This tringle C is futhermore fixed near its middle portion in the neck strap G connected to the saddle support B of the frame N by being screwed in a threaded socket in the end of the strap.

The auxiliary frame carries the saddle O, which is supported on the saddle support B, which rests on a curved plate H supported at its ends from the axle A, and the support B is continued below this plate H and is fixed on the middle of the axle A by means of a collar plate R below which the support is lengthened, and provided with a foot-rest F. A tringle or brace-rod I connected at its upper end to the upper part of the support B, and at its lower end to the lower part thereof, is provided for strengthening this support B.

The person occupying the second saddle O of the auxiliary frame N may at pleasure have it facing either forward or backward by altering the position of the collar plate in its connection with the axle A. It is shown as facing backward, but I prefer to have this saddle always facing forward.

In operation, when the bicyclette or bicycle J is to be used as a bicycle, the auxiliary apparatus N is disconnected by uncoupling its union nut E and the clamp Q. When the tricycle is desired, the auxiliary apparatus is coupled to the bicycle, as described, whereupon the apparatus can be used as a tricycle.

It will be seen that my invention provides an improved velocipede wherein the usual bicycle is adapted without any material change in its construction which would interfere with its use as a bicycle for connection with the auxiliary apparatus comprising a supplemental axle wheel and seat, to transform the velocipede into a tricycle. And that this transformation is so simple that it can be quickly accomplished with the minimum of labor.

It will be understood that the invention is not limited to the exact details of construction specified, as these may be modified as circumstances dictate, without departing from the essential features of the invention.

What I claim is, in velocipedes, the following defined novel features and combinations, substantially as hereinbefore set forth, namely:

1. In a velocipede, a bicycle, having a frame J, a wheel L therein, and an axle-rod for said wheel, in combination with an auxiliary apparatus, comprising an additional wheel P, a long axle A carrying said wheel P at one end, and having a coupling at its other end engaging said bicycle, and a seat O carried on said axle A intermediate of said wheel P and its other end, said bicycle and auxiliary apparatus constructed when coupled together to constitute a tricycle for the use of two persons, whereby when coupled together said apparatus can be used as a tricycle and when separated said bicycle can be used as a bicycle, substantially as and for the purpose set forth.

2. In a velocipede, a bicycle constructed with a screw threaded projection as $a$ at its side, in combination with an additional axle as A, provided with a wheel and carrying a seat, said axle constructed at its other end to be coupled to said frame and carrying a union nut for engaging said screw threaded projection on said bicycle for coupling said axle thereto, whereby when said parts are coupled together they constitute a tricycle for use by two persons, and when uncoupled said bicycle can be used as such.

3. In a velocipede a bicycle constructed with a nut $e$ on the axle of its rear wheel, having screw threaded prolongation $a$, in combination with an additional axle A having a wheel P at one end, carrying a seat, and having the union nut E at its other end constructed to engage said projection $a$ for coupling said axle to said bicycle, whereby when coupled together said parts can be used as a tricycle and when uncoupled said bicycle can be used as a bicycle.

4. In a velocipede, a bicycle constructed with a screw threaded projection $a$, in combination with a frame N constructed to be coupled to said bicycle and having an axle A, a wheel P at one end thereof and a nut E at the other end thereof for engaging said projection on said bicycle, a tringle C connected to the wheel end of said axle and constructed at its other end to be coupled to the frame of said bicycle, a supplementary seat O, and a support B carrying said seat and carried by said axle.

In witness whereof I have hereunto signed my name in the presence of two subscribing witnesses.

JEAN BERTOUX.

Witnesses:
ROBT. M. HOOPER,
AUGUSTE MATHIEU.